United States Patent
Ogawa et al.

(10) Patent No.: US 8,557,467 B2
(45) Date of Patent: Oct. 15, 2013

(54) FUEL CELL AND FUEL CELL STACK

(75) Inventors: Tetsuya Ogawa, Wako (JP); Yukihiko Kiyohiro, Wako (JP); Tsutomu Takahashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 364 days.

(21) Appl. No.: 12/681,536

(22) PCT Filed: Sep. 24, 2008

(86) PCT No.: PCT/JP2008/067783
§ 371 (c)(1),
(2), (4) Date: Apr. 2, 2010

(87) PCT Pub. No.: WO2009/044755
PCT Pub. Date: Apr. 9, 2009

(65) Prior Publication Data
US 2010/0209799 A1    Aug. 19, 2010

(30) Foreign Application Priority Data

Oct. 4, 2007   (JP) ................................ 2007-261121

(51) Int. Cl.
*H01M 2/38* (2006.01)
(52) U.S. Cl.
USPC ........... 429/457; 429/482; 429/483; 429/490; 429/505; 429/508
(58) Field of Classification Search
USPC ................................................ 429/400–535
See application file for complete search history.

(56) References Cited

U.S. PATENT DOCUMENTS

| 8,110,318 B2 | 2/2012 | Tsunoda | |
|---|---|---|---|
| 2005/0136319 A1* | 6/2005 | Tsunoda et al. | 429/39 |
| 2005/0142424 A1* | 6/2005 | Homma et al. | 429/38 |

FOREIGN PATENT DOCUMENTS

| JP | 2006-120589 | 5/2006 |
|---|---|---|
| JP | 2006-185803 | 7/2006 |
| WO | 2006/043729 A2 | 4/2006 |
| WO | 2007/074666 A1 | 7/2007 |
| WO | 2007/089003 A2 | 8/2007 |
| WO | 2008/047848 A1 | 4/2008 |

OTHER PUBLICATIONS

International Search Report for Application No. PCT/JP2008/067783, dated May 13, 2009.
Japanese Office Action for Application No. 2007-261121, 5 pages, dated Oct. 2, 2012.

* cited by examiner

*Primary Examiner* — Christopher Schatz
(74) *Attorney, Agent, or Firm* — Nelson Mullins Riley & Scarborough LLP

(57) ABSTRACT

A fuel cell includes separators sandwiching electrolyte electrode assemblies. Each of the separators includes a fuel gas supply passage, four first bridges extending radially outwardly from the fuel gas supply section, and sandwiching sections connected to the first bridges. A fuel gas supply passage extends through the fuel gas supply section. Each of the sandwiching sections has a fuel gas channel and an oxygen-containing gas channel. The four electrolyte electrode assemblies are arranged concentrically around the fuel gas supply section. A fuel cell stack includes such fuel cells.

11 Claims, 22 Drawing Sheets

FUEL CELL AND FUEL CELL STACK

Related Applications

This application is a 35 U.S.C. 371 national stage filing of International Application No. PCT/JP2008/067783 filed Sep. 24, 2008, which claims priority to Japanese Patent Application No. 2007-261121 filed on Oct. 4, 2007 in Japan. The contents of the aforementioned applications are hereby incorporated by reference.

TECHNICAL FIELD

The present invention relates to a fuel cell formed by stacking electrolyte electrode assemblies between separators. Each of the electrolyte electrode assemblies includes an anode, a cathode, and an electrolyte interposed between the anode and the cathode. Further, the present invention relates to a fuel cell stack formed by stacking a plurality of the fuel cells.

BACKGROUND ART

Typically, a solid oxide fuel cell (SOFC) employs an electrolyte of ion-conductive solid oxide such as stabilized zirconia. The electrolyte is interposed between an anode and a cathode to form an electrolyte electrode assembly. The electrolyte electrode assembly is interposed between separators (bipolar plates). In use, generally, predetermined numbers of the electrolyte electrode assemblies and the separators are stacked together to form a fuel cell stack.

In the fuel cell, in order to supply a fuel gas such as a hydrogen-containing gas and an oxygen-containing gas such as the air to the anode and the cathode of the electrolyte electrode assembly, respectively, a fuel gas channel and an oxygen-containing gas channel are formed along surfaces of the separators.

For example, in a flat stack fuel cell disclosed in Japanese Laid-Open Patent Publication No. 2006-120589, as shown in FIG. 22, a separator 1 stacked on a power generation cell is provided. The separator 1 is formed by connecting left and right manifold parts 2a and a part 2b at the center where the power generation cell is provided, by joint parts 2c. The joint parts 2c have flexibility.

The manifold parts 2a have gas holes 3, 4. One gas hole 3 is connected a fuel gas channel 3a, and the other gas hole 4 is connected to an oxygen-containing gas channel 4a. The fuel gas channel 3a and the oxygen-containing gas channel 4a extend in a spiral pattern into the part 2b, and are opened to a fuel electrode current collector and an air electrode current collector, respectively, at positions near the center of the part 2b.

In the above conventional technique, the part 2b for placing the power generation cell is provided at the center of the separator 1. In the structure, it is not possible to suitably heat the fuel gas and the oxygen-containing gas flowing through the gas holes 3, 4 by the heat produced in the power generation of the fuel cell. Therefore, it is not possible to improve the heat efficiency or facilitate thermally self-sustained operation.

Further, one power generation cell is provided in each separator 1. Therefore, in order to obtain the high output, it is necessary to stack a large number of power generation cells, and the overall size of the fuel cell in the stacking direction becomes considerably large. Further, if any power generation failure occurs in one of the power generation cells, the failure causes malfunction in power generation of the entire fuel cell. Therefore, power generation cannot be performed efficiently.

DISCLOSURE OF INVENTION

The present invention has been made to solve the problem of this type, and an object of the present invention is to provide a fuel cell and a fuel cell stack which make it possible to improve the heat efficiency and facilitate thermally self-sustained operation, while maintaining the efficient power generation operation, and providing the best space efficiency.

The present invention relates to a fuel cell formed by stacking electrolyte electrode assemblies between separators. Each of the electrolyte electrode assemblies includes an anode, a cathode, and an electrolyte interposed between the anode and the cathode.

Each of the separators includes sandwiching sections, bridges connected to the sandwiching sections, and a reactant gas supply section connected to the bridges. The sandwiching section of one separator and the sandwiching section of another separator sandwich the electrolyte electrode assemblies. Each of the sandwiching sections has a fuel gas channel for supplying a fuel gas along an electrode surface of the anode and an oxygen-containing gas channel for supplying an oxygen-containing gas along an electrode surface of the cathode separately. Each of the bridges has a reactant gas supply channel for supplying the fuel gas to the fuel gas channel or supplying the oxygen-containing gas to the oxygen-containing gas channel. A reactant gas supply passage extends through the reactant gas supply section in the stacking direction for supplying the fuel gas or the oxygen-containing gas to the reactant gas supply channel.

The reactant gas supply section is provided at the center of the separator. Four electrolyte electrode assemblies are arranged in a circle around the reactant gas supply section.

Further, the present invention relates to a fuel cell stack formed by stacking a plurality of fuel cells in a stacking direction. Each of the fuel cells is formed by stacking electrolyte electrode assemblies between separators. Each of the electrolyte electrode assembly includes an anode, a cathode, and an electrolyte interposed between the anode and the cathode.

Each of the separators includes sandwiching sections, bridges connected to the sandwiching sections, and a reactant gas supply section connected to the bridges. The sandwiching sections sandwich the electrolyte electrode assemblies. Each of the sandwiching sections has a fuel gas channel for supplying a fuel gas along an electrode surface of the anode and an oxygen-containing gas channel for supplying an oxygen-containing gas along an electrode surface of the cathode separately. Each of the bridges has a reactant gas supply channel for supplying the fuel gas to the fuel gas channel or supplying the oxygen-containing gas to the oxygen-containing gas channel. A reactant gas supply passage extends through the reactant gas supply section in the stacking direction for supplying the fuel gas or the oxygen-containing gas to the reactant gas supply channel.

The reactant gas supply section is provided at the center of the separator. Four electrolyte electrode assemblies are arranged in a circle around the reactant gas supply section.

In the present invention, since the four electrolyte electrode assemblies are arranged in a circle around the reactant gas supply section, the reactant gases supplied to the fuel cells or the fuel cell stack are suitably heated by heat generated in the power generation. Thus, it is possible to improve the heat efficiency and facilitate the thermally self-sustained operation of the fuel cells or the fuel cell stack. Thermally-self sustained operation herein means operation where the operating temperature of the fuel cells or the fuel cell stack is maintained using only heat energy generated in the fuel cells or the fuel cells stack, without supplying additional heat from the outside.

The four electrolyte electrode assemblies are arranged in a circle on the surface of the separator. This structure has a high occupancy ratio of the electrolyte electrode assemblies, among various fuel cell structures where a plurality of electrolyte electrode assemblies each having the same shape and the same area are arranged in a circle on a separator surface.

Specifically, the area occupied by the four electrolyte electrode assemblies in the circumscribed circle of the electrolyte electrode assemblies is large in comparison with the area occupied by three or less electrolyte electrode assemblies in the circumscribed circle of the electrolyte electrode assemblies. Thus, the area which is not occupied by the electrolyte electrode assemblies is minimized, and the space efficiency in the surface of the separator is improved.

In the structure, the stack volume relative to the power generation output is small in comparison with the stack volume of the fuel cell stack formed by arranging, e.g., five or more electrolyte electrode assemblies on the separator. Therefore, the stack volume of the fuel cell stack formed by stacking fuel cells required for achieving a certain power generation output is reduced. Thus, the overall size of the fuel cell stack is reduced easily.

Further, in the structure, the stack surface area relative to the power generation output is small in comparison with the stack surface of the fuel cell stack formed by arranging, e.g., five or more electrolyte electrode assemblies on the separator. Therefore, heat radiation from the fuel cell stack is minimized, and it is possible to improve the heat efficiency, and facilitate the thermally self-sustained operation.

The above and other objects, features and advantages of the present invention will become more apparent from the following description when taken in conjunction with the accompanying drawings in which preferred embodiments of the present invention are shown by way of illustrative example.

BEST MODE FOR CARRYING OUT THE INVENTION

Figure 1:
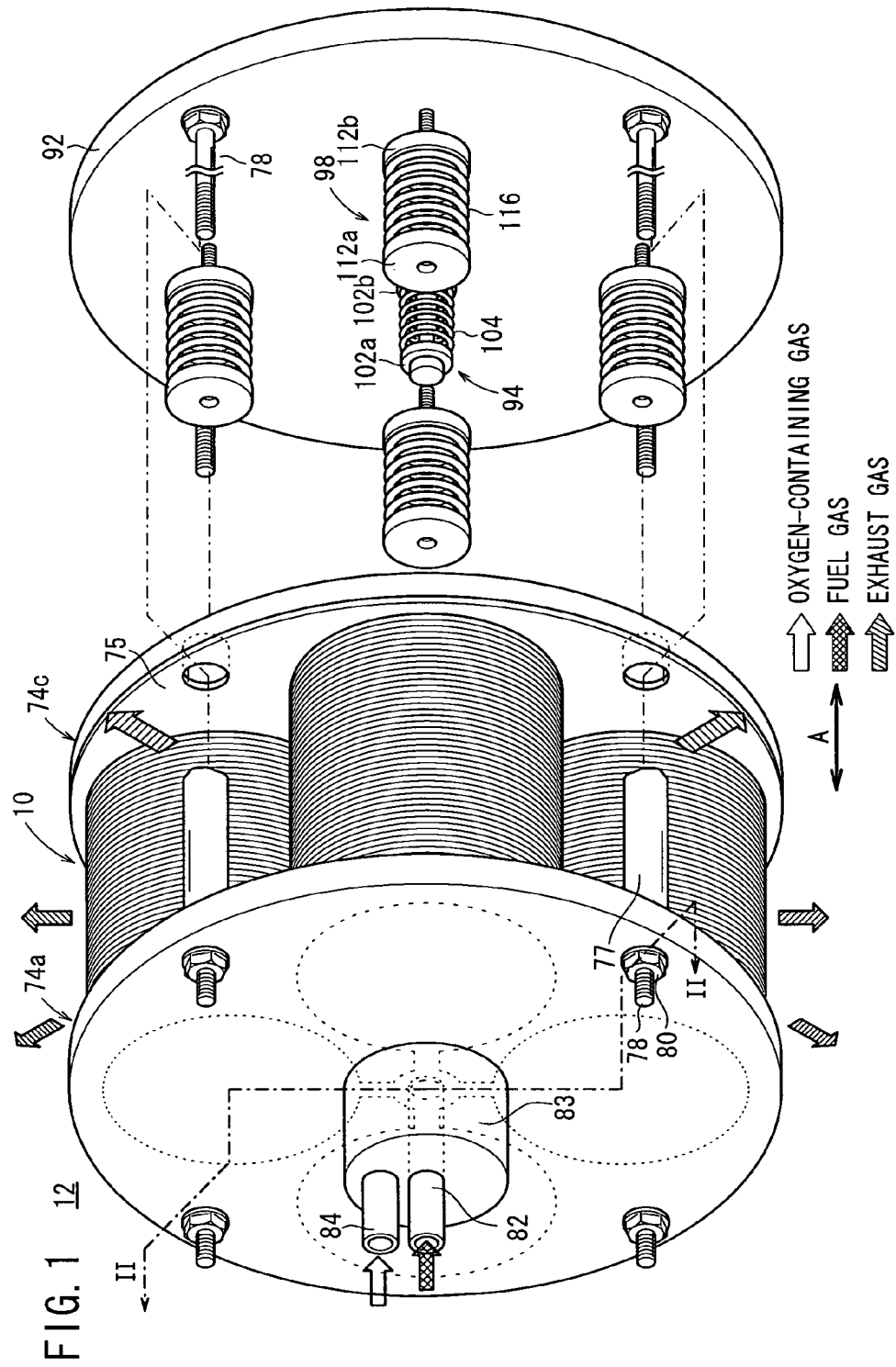
FIG. 1 is a perspective view schematically showing a fuel cell stack formed by stacking fuel cells according to a first embodiment of the present invention.
Figure 2:
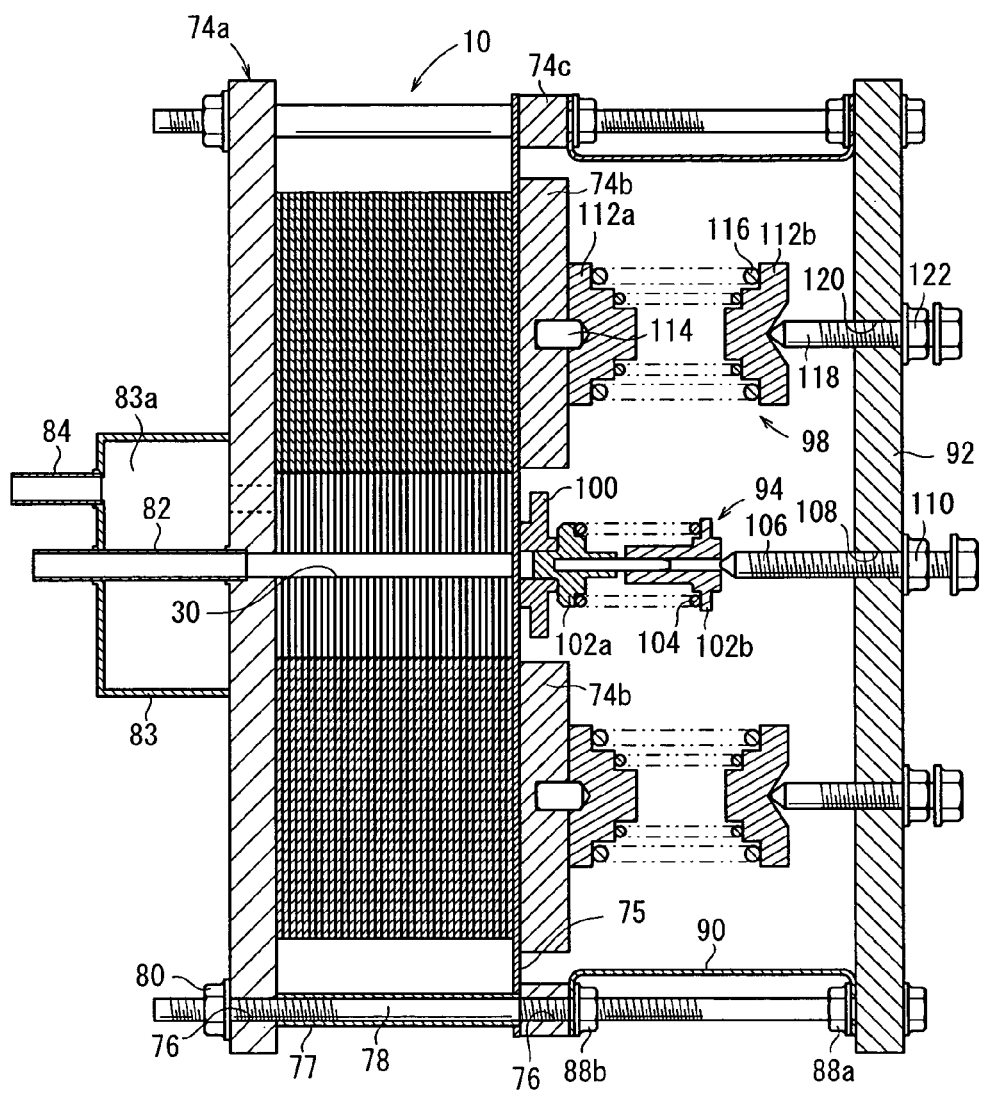
FIG. 2 is a cross sectional view showing the fuel cell stack taken along a line II-II in FIG. 1.

FIG. 1 is a perspective view schematically showing a fuel cell stack 12 formed by stacking fuel cells 10 according to a first embodiment of the present invention in a direction indicated by an arrow A. FIG. 2 is a cross sectional view showing the fuel cell stack 12 taken along a line II-II in FIG. 1.

Figure 3:
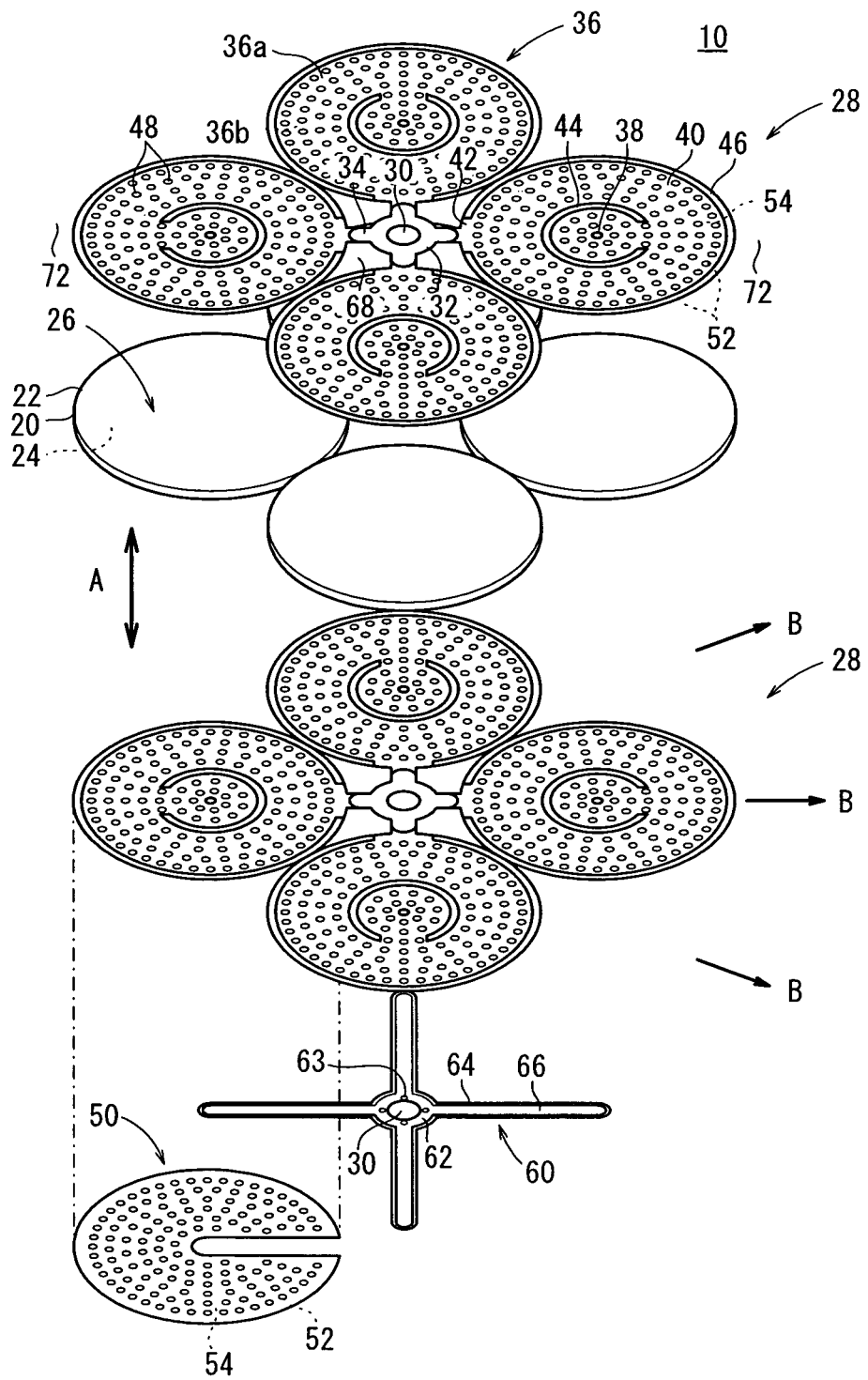
FIG. 3 is an exploded perspective view showing the fuel cell.
Figure 4:
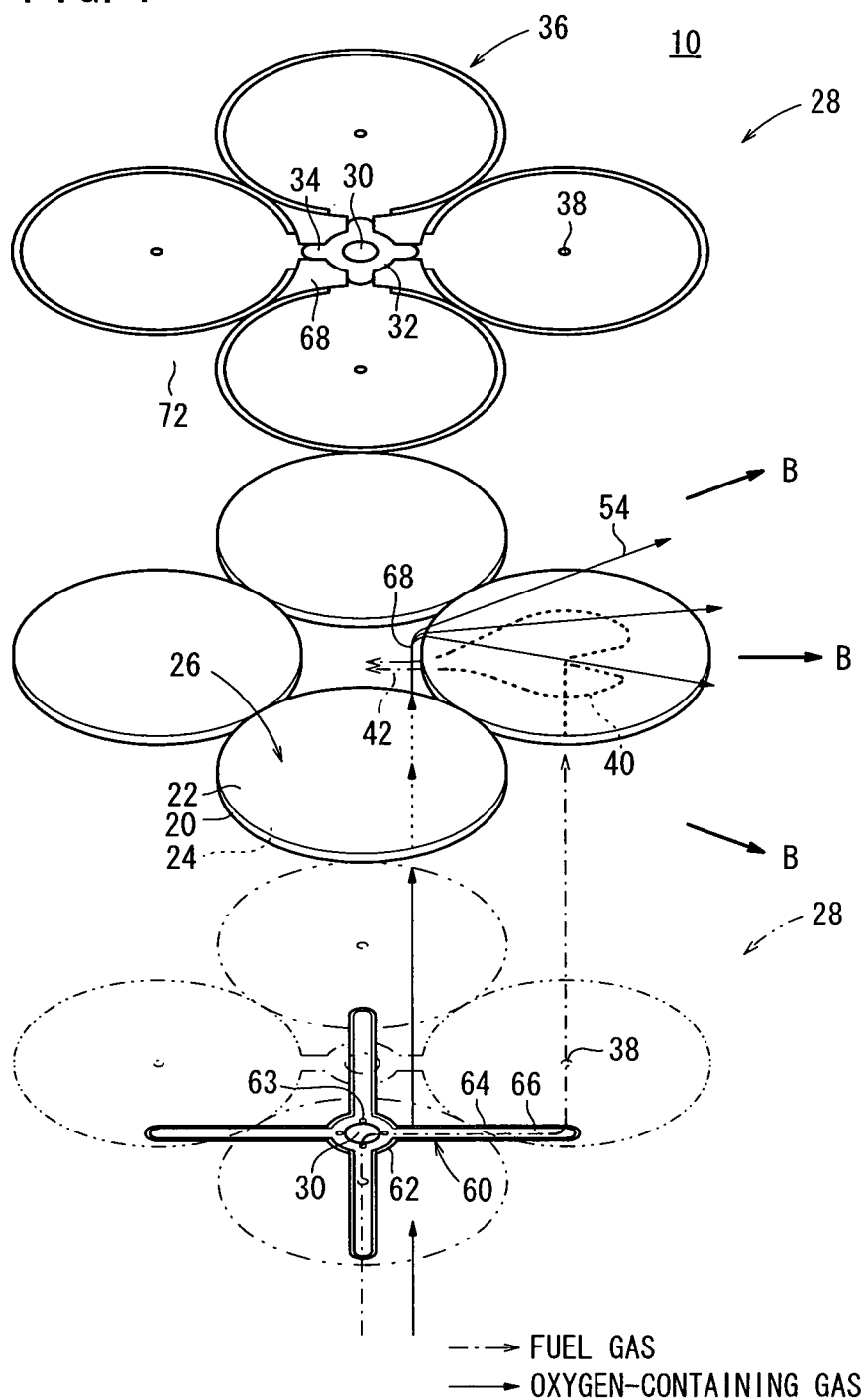
FIG. 4 is a partial exploded perspective view showing gas flows in the fuel cell.

The fuel cell 10 is a solid oxide fuel cell (SOFC) used in various applications, including stationary and mobile applications. For example, the fuel cell 10 is mounted on a vehicle. As shown in FIGS. 3 and 4, the fuel cell 10 includes electrolyte electrode assemblies (MEAs) 26. Each of the electrolyte electrode assemblies 26 includes a cathode 22, an anode 24, and an electrolyte (electrolyte plate) 20 interposed between the cathode 22 and the anode 24. For example, the electrolyte 20 is made of ion-conductive solid oxide such as stabilized zirconia. The electrolyte electrode assembly 26 has a circular disk shape. A barrier layer (not shown) is provided at least at the outer circumferential edge of the electrolyte electrode assembly 26 for preventing entry or discharge of the oxygen-containing gas and the fuel gas.

The fuel cell 10 is formed by sandwiching four electrolyte electrode assemblies 26 between a pair of separators 28. The four electrolyte electrode assemblies 26 are provided in a circle around a fuel gas supply passage (reactant gas supply passage) 30 extending through the center of the separators 28.

As shown in FIG. 3, each of the separators 28 includes, e.g., one metal plate of, e.g., stainless alloy or a carbon plate. A fuel gas supply section (reactant gas supply section) 32 is formed at the center of the separator 28, and the fuel gas supply passage 30 extends through the fuel gas supply section 32. Four first bridges 34 extend radially outwardly from the fuel gas supply section 32 at equal intervals, e.g., 90°. The first fuel gas supply section 32 is integral with sandwiching sections 36 each having a relatively large diameter through the first bridges 34. The centers of sandwiching sections 36 are equally distant from the center of the fuel gas supply section 32.

Each of the sandwiching sections 36 has a circular disk shape, having substantially the same dimensions as the electrolyte electrode assembly 26. The sandwiching sections 36 are separated from each other. A fuel gas inlet 38 for supplying the fuel gas is formed at the center of the sandwiching section 36, or at an upstream position deviated from the center of the sandwiching section 36 in the flow direction of the oxygen-containing gas.

Each of the sandwiching sections 36 has a fuel gas channel 40 on a surface 36a which contacts the anode 24, for supplying a fuel gas along an electrode surface of the anode 24. Further, a fuel gas discharge channel 42 for discharging the fuel gas consumed in the fuel gas channel 40 and a circular arc wall 44 forming a detour path to prevent the fuel gas from flowing straight from the fuel gas inlet 38 to the fuel gas discharge channel 42 are provided on the surface 36a of the sandwiching section 36. The circular arc wall 44 is in contact with the anode 24.

The circular arc wall 44 has a substantially horseshoe shape. The fuel gas inlet 38 is surrounded by the circular arc wall 44 on a distal end side thereof, and the fuel gas discharge channel 42 is provided on a proximal end side of the circular arc wall 44, near the first bridge 34. On the surface 36a, a circumferential protrusion 46 and a plurality of projections 48 are provided. The circumferential protrusion 46 protrudes on the fuel gas channel 40 side, and contacts the outer edge of the anode 24, and the projections 48 also contact the anode 24.

The protrusion 46 has a substantially ring shape with partial cutaway at a position corresponding to the fuel gas discharge channel 42. The projections 48 are made of solid portions formed by, e.g., etching, or hollow portions formed by press forming.

Figure 5:
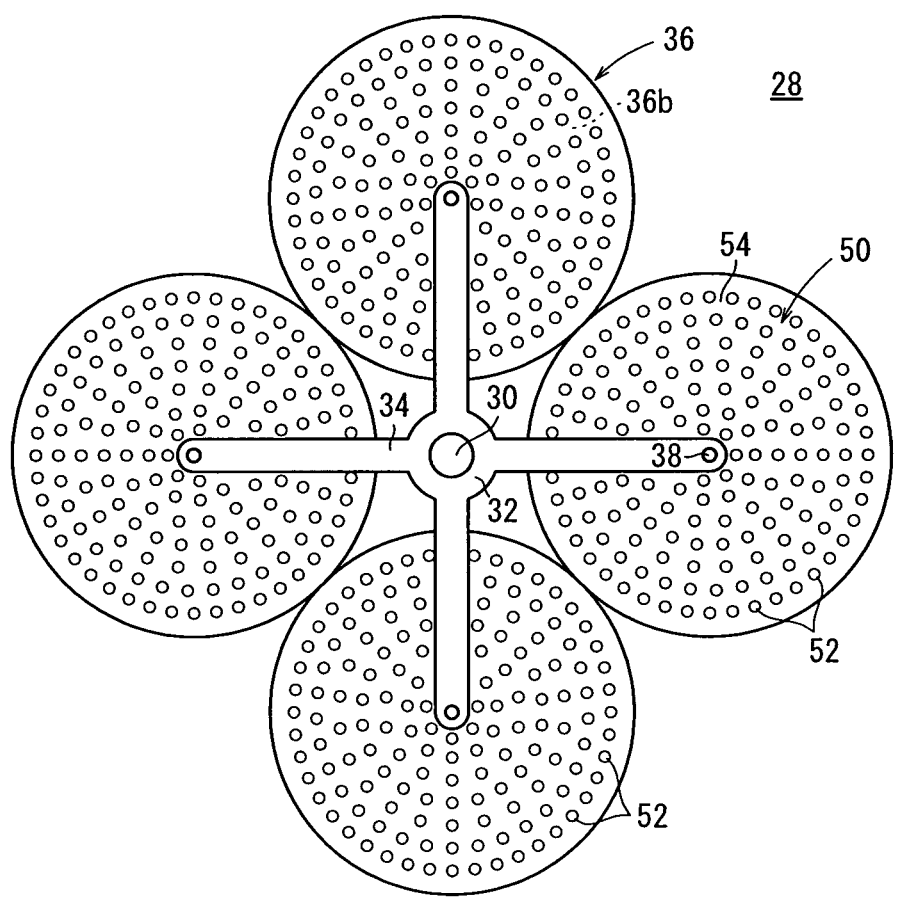
FIG. 5 is a plan view showing a separator of the fuel cell.
Figure 6:
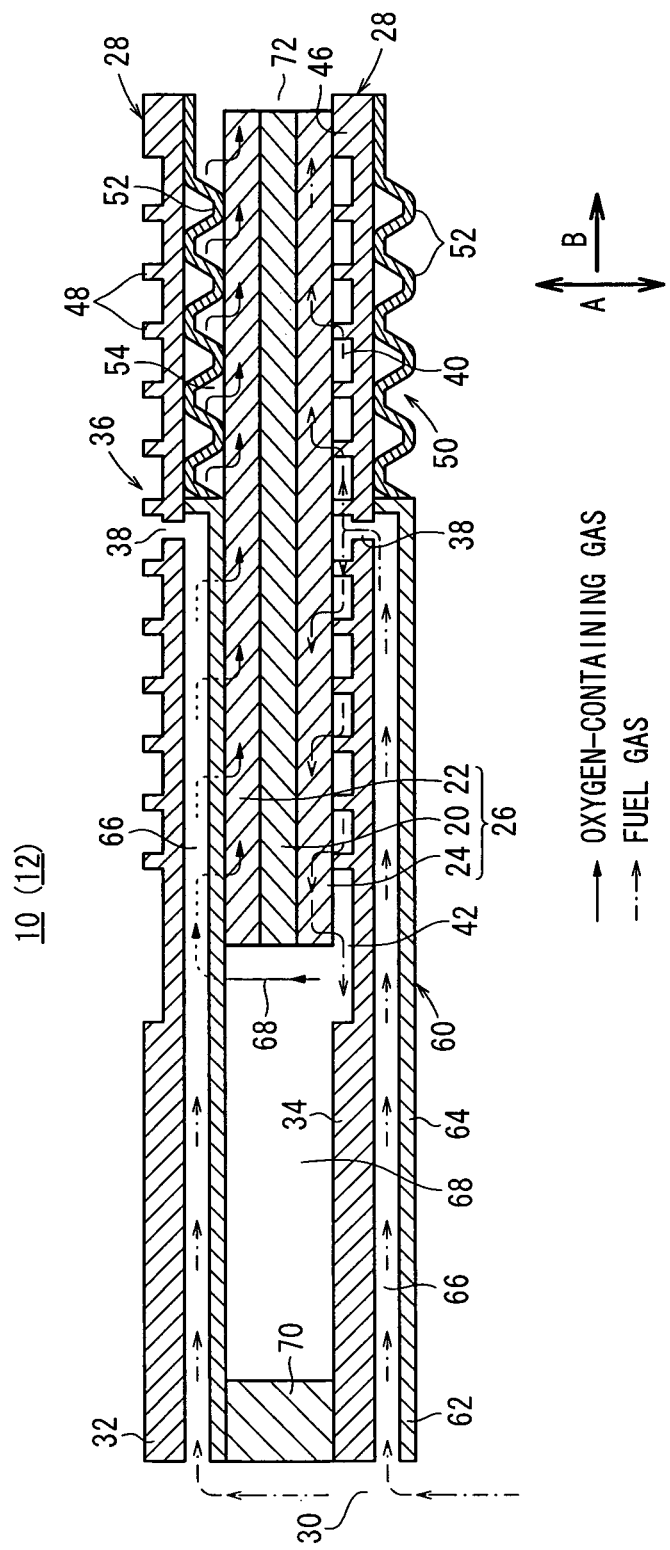
FIG. 6 is a cross sectional view schematically showing operation of the fuel cell.

As shown in FIGS. 5 and 6, each of the sandwiching sections 36 has a substantially planar surface 36b which faces the cathode 22. A plate 50 having a circular disk shape is fixed to the surface 36b, e.g., by diffusion bonding, laser welding, or the like. A plurality of projections 52 are provided on the plate 50, e.g., by press forming. By the projections 52, an oxygen-containing gas channel 54 for supplying an oxygen-containing gas along an electrode surface of the cathode 22 is formed on the surface 36b side of the sandwiching section 36. The projections 52 function as a current collector.

As shown in FIG. 3, a channel member 60 is fixed to a surface of the separator 28 facing the cathode 22, e.g., by brazing, diffusion bonding, or laser welding. The channel member 60 has a planar shape. The fuel gas supply passage 30 extends through a fuel gas supply section 62 at the center of the channel member 60. A predetermined number of reinforcement bosses 63 are formed in the fuel gas supply section 62.

Four second bridges 64 extend radially from the fuel gas supply section 62. Each of the second bridges 64 is fixed to the separator 28 from the first bridge 34 to the surface 36b of the sandwiching section 36 to cover the fuel gas inlet 38 (see FIG. 6).

From the fuel gas supply section 62 to the second bridge 64, a fuel gas supply channel (reactant gas supply channel) 66 connecting the fuel gas supply passage 30 to the fuel gas inlet 38 is formed. For example, the fuel gas supply channel 66 is formed by, e.g., etching or under press forming.

As shown in FIG. 6, the oxygen-containing gas channel 54 is connected to the oxygen-containing gas supply passage (reactant gas supply passage) 68 for supplying the oxygen-containing gas from a space between an inner circumferential edge of the electrolyte electrode assembly 26 and an inner circumferential edge of the sandwiching section 36 in a direction indicated by an arrow B. The oxygen-containing gas supply passage 68 extends inside the sandwiching sections 36 and between the respective first bridges 34 in the stacking direction indicated by the arrow A.

An insulating seal 70 for sealing the fuel gas supply passage 30 is provided between the separators 28. For example, crustal component material such as mica material and ceramic material, glass material, and composite material of clay and plastic may be used for the insulating seal 70. The insulating seal 70 seals the fuel gas supply passage 30 from the electrolyte electrode assemblies 26. An exhaust gas channel 72 is provided outside (around) the sandwiching sections 36 of the fuel cells 10.

As shown in FIGS. 1 and 2, the fuel cell stack 12 includes a first end plate 74a having a substantially circular disk shape at one end in the stacking direction of the fuel cells 10. Further, the fuel cell stack 12 includes a plurality of end plates 74b and a fixing ring 74c at the other end in the stacking direction of the fuel cells 10, through a partition wall 75. Each of the end plates 74b has a small diameter, and a substantially circular shape, and the fixing ring 74c has a large diameter, and a substantially ring shape. The partition wall 75 prevents diffusion of the exhaust gas to the outside of the fuel cells 10. The number of end plates 74b is four, corresponding to the positions of the electrolyte electrode assemblies 26 stacked.

The first end plate 74a and the fixing ring 74c include a plurality of holes 76. Bolts 78 are inserted into the holes 76 and bolt insertion collar members 77, and screwed into nuts 80. By the bolts 78 and the nuts 80, the first end plate 74a and the fixing ring 74c are fixedly tightened together.

One fuel gas supply pipe 82, a casing 83, and one oxygen-containing gas supply pipe 84 are provided at the first end plate 74a. The fuel gas supply pipe 82 is connected to the fuel gas supply passage 30. The casing 83 has a cavity 83a connected to the respective oxygen-containing gas supply passages 68. The oxygen-containing gas supply pipe 84 is connected to the casing 83, and to the cavity 83a.

A support plate 92 is fixed to the first end plate 74a through a plurality of bolts 78, nuts 88a, 88b, and plate collar members 90. A first load applying unit 94 for applying a tightening load to the fuel gas supply sections 32, 62, and second load applying units 98 for applying a tight load to each of the electrolyte electrode assemblies 26 are provided between the support plate 92 and the first end plate 74a. The first load applying unit 94 and the second load applying units 98 form a load applying mechanism.

The first load applying unit 94 includes a presser member 100 provided at the center of the fuel cells (centers of the fuel gas supply sections 32, 62) for preventing leakage of the fuel gas from the fuel gas supply passage 30. The presser member 100 is provided near the center of the four second end plates 74b for pressing the fuel cells 10 through the partition wall 75. A first spring 104 is provided at the presser member 100 through a first receiver member 102a and a second receiver member 102b. A tip end of the first presser bolt 106 contacts the second receiver member 102b. The first presser bolt 106 is screwed into a first screw hole 108 formed in the support plate 92. The position of the first presser bolt 106 is adjustable through a first nut 110.

Each of the second load applying units 98 includes a third receiver member 112a at the second end plate 74b, corresponding to each of the electrolyte electrode assemblies 26. The third receiver member 112a is positioned on the second end plate 74b through the pin 114. One end of the second spring 116 contacts the third receiver member 112a and the other end of the second spring 116 contacts the fourth receiver member 112b. A tip end of the second presser bolt 118 contacts the fourth receiver member 112b. The second presser bolt 118 is screwed into the second screw hole 120 formed in the support plate 92. The position of the second presser bolt 118 is adjustable through the second nut 122.

Operation of the fuel cell stack 12 will be described below.

As shown in FIG. 1, the fuel gas is supplied through the fuel gas supply pipe 82 to the first end plate 74a. Then, the fuel gas flows into the fuel gas supply passage 30. The air as the oxygen-containing gas is supplied from the oxygen-containing gas supply pipes 84 to each of the oxygen-containing gas supply passages 68 through the cavity 83a.

As shown in FIG. 6, the fuel gas flows along the fuel gas supply passage 30 of the fuel cell stack 12 in the stacking direction indicated by the arrow A. The fuel gas moves through the fuel gas supply channel 66 of each fuel cell 10 along the surface of the separator 28.

The fuel gas flows from the fuel gas supply channel 66 into the fuel gas channel 40 through the fuel gas inlet 38 formed in the sandwiching section 36. The fuel gas inlet 38 is provided at substantially the central position of the anode 24 of each electrolyte electrode assembly 26. Thus, the fuel gas is supplied from the fuel gas inlet 38 to the anode 24, and flows along the fuel gas channel 40 from substantially the central region to the outer circumferential region of the anode 24.

The oxygen-containing gas flows into the space between the inner circumferential edge of the electrolyte electrode assembly 26 and the inner circumferential edge of the sandwiching section 36 in the direction indicated by the arrow B, and flows toward the oxygen-containing gas channel 54. In the oxygen-containing gas channel 54, the oxygen-containing gas flows from the inner circumferential edge (center of the separator 28) to the outer circumferential edge (outer circumferential edge of the separator 28) of, i.e., from one end to the other end of the cathode 22 of the electrolyte electrode assembly 26.

Thus, in each of the electrolyte electrode assemblies 26, the fuel gas flows from the center to the outer circumferential side on the electrode surface of the anode 24, and the oxygen-containing gas flows in one direction indicated by the arrow B on the electrode surface of the cathode 22. At this time, oxide ions flow through the electrolyte 20 toward the anode 24 for generating electricity by electrochemical reactions.

The exhaust gas chiefly containing the air after consumption in the power generation reaction is discharged from the outer circumferential region of each of the electrolyte electrode assemblies 26, and flows through the exhaust gas channels 72 as the off gas, and the off gas is discharged from the fuel cell stack 12 (see FIG. 1).

In the first embodiment, the four electrolyte electrode assemblies are arranged in a circle around the fuel gas supply section 32. In the structure, the fuel gas and the oxygen-containing gas supplied to the fuel cells 10 (fuel cell stack 12) is suitably heated by heat generated by power generation and heat generated by reaction of the remaining fuel gas discharged from the fuel gas discharge channel 42 to the oxygen-containing gas supply passage 68 and the oxygen-containing gas flowing through the oxygen-containing gas supply passage 68. Thus, it is possible to improve the heat efficiency and facilitate the thermally self-sustained operation of the fuel cells 10 (fuel cell stack 12).

Figure 7:
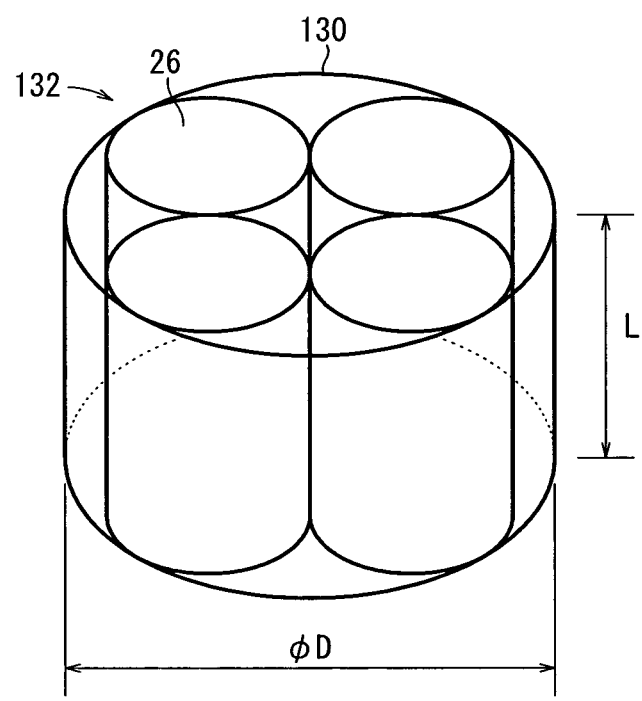
FIG. 7 is a perspective view showing a stack formed by stacking electrolyte electrode assemblies in a predetermined number of stages each including four electrolyte electrode assemblies arranged in contact with each other.

Further, the four electrolyte electrode assemblies 26 are arranged in a circle in the surface of the separator 28. As shown in FIG. 7, assuming that the four electrolyte electrode assemblies 26 are arranged in contact with each other to form a fuel cell 10, the diameter of the circumscribed circle of the electrolyte electrode assemblies 26 is defined as D, and assuming that a stack 132 is formed by stacking the fuel cells 10 in a predetermined number of stages to achieve the desired power generation output, the dimension of the stack 132 in the stacking direction is defined as L.

Figure 8:
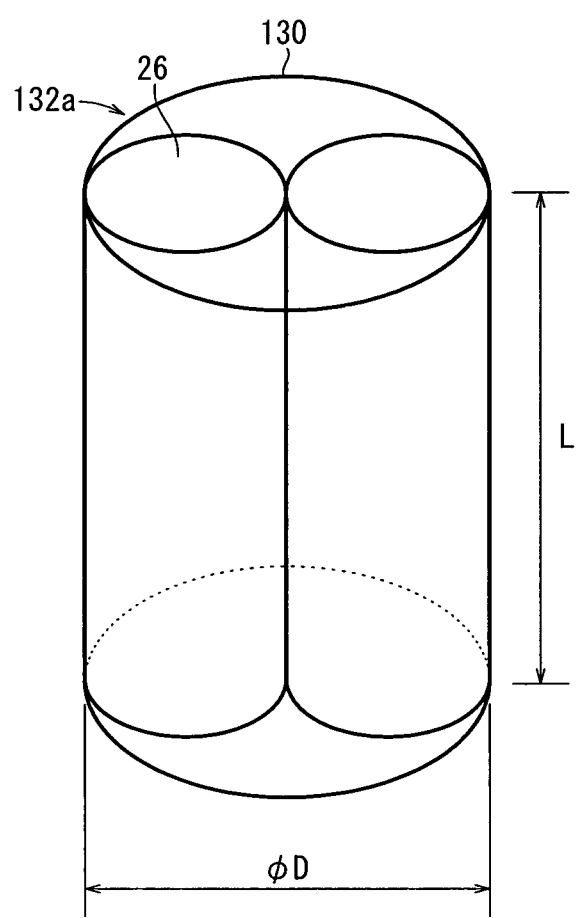
FIG. 8 is a perspective view showing a stack formed by stacking electrolyte electrode assemblies in a predetermined number of stages each including two electrolyte electrode assemblies arranged in contact with each other.
Figure 9:
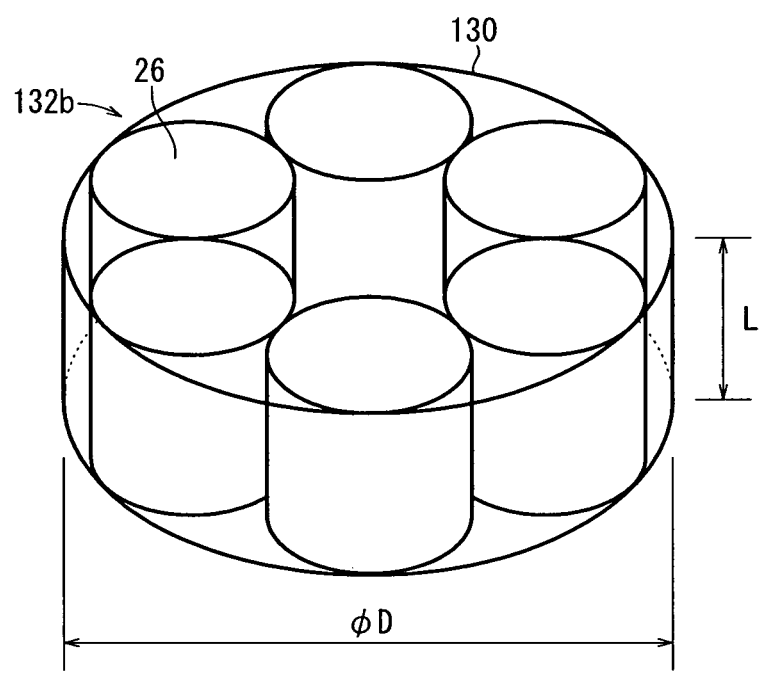
FIG. 9 is a perspective view showing a stack formed by stacking electrolyte electrode assemblies in a predetermined number of stages each including six electrolyte electrode assemblies arranged in contact with each other.
Figure 10:
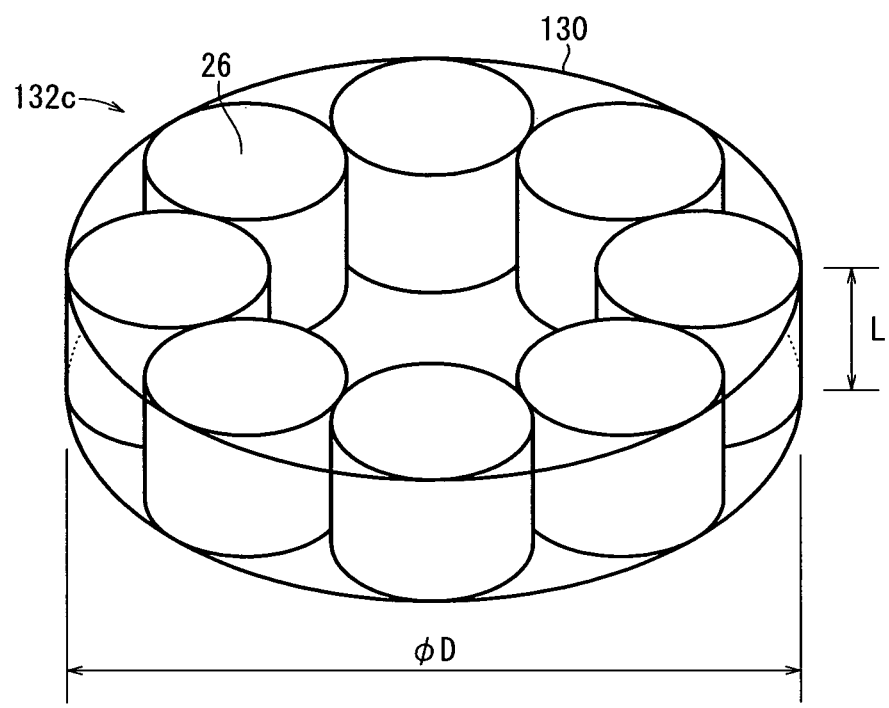
FIG. 10 is a perspective view showing a stack formed by stacking electrolyte electrode assemblies in a predetermined number of stages each including eight electrolyte electrode assemblies arranged in contact with each other.

Likewise, FIG. 8 shows a stack 132a formed by arranging two electrolyte electrode assemblies 26 in contact with each other in the same plane to form a fuel cell, and stacking the fuel cells in a predetermined number of stages to achieve the desired power generation output, FIG. 9 shows a stack 132b formed by arranging six electrolyte electrode assemblies 26 in contact with each other in the same plane to form a fuel cell, and stacking the fuel cells in a predetermined number of stages to achieve the desired power generation output, and FIG. 10 shows a stack 132c formed by arranging eight electrolyte electrode assemblies 26 in contact with each other in the same plane to form a fuel cell, and stacking the fuel cells in a predetermined number of stages to achieve the desired power generation output.

Figure 11:
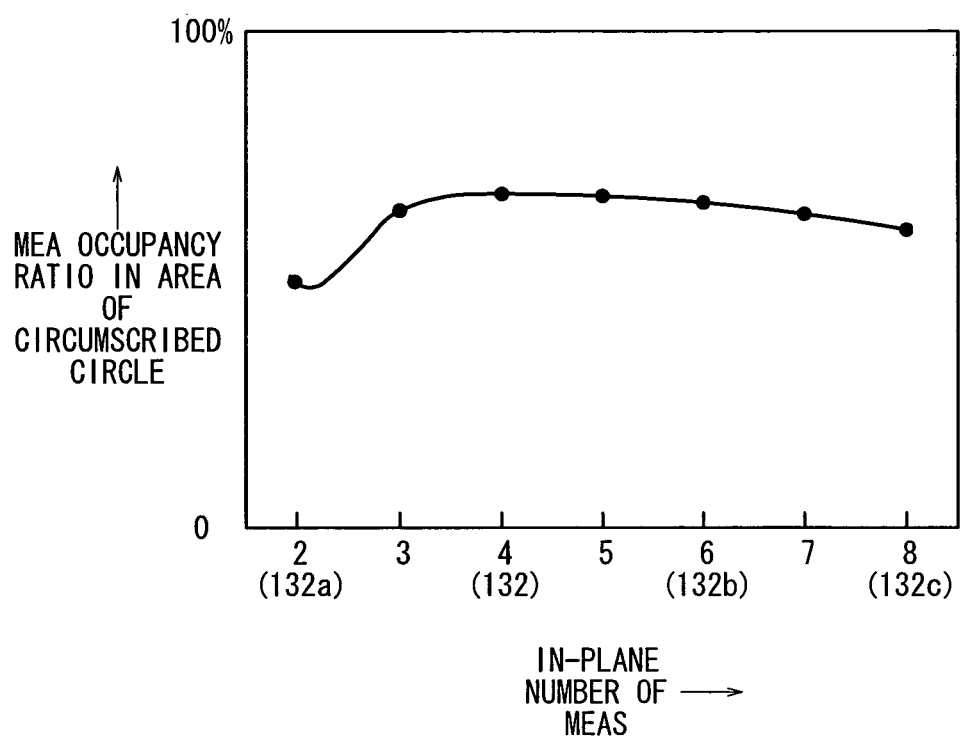
FIG. 11 is a graph showing the occupancy ratio of the electrolyte electrode assemblies in an area of a circumscribed circle.

For each of the stacks 132, 132a to 132c, the occupied area (occupancy ratio) of the electrolyte electrode assemblies 26 in a circumscribed circle 130 is shown in FIG. 11. As can be seen from FIG. 11, in the case of using the four electrolyte electrode assemblies 26, in comparison with the case of arranging three or less electrolyte electrode assemblies 26, the area occupied by the electrolyte electrode assemblies 26 is large. Thus, in the fuel cell 10 of the present application, the non-occupancy ratio of the electrolyte electrode assemblies 26 (the ratio of the area which is not occupied by the electrolyte electrode assemblies 26) is minimized. Accordingly, improvement of the space efficiency in the surface of the separator 28 is achieved.

Figure 12:
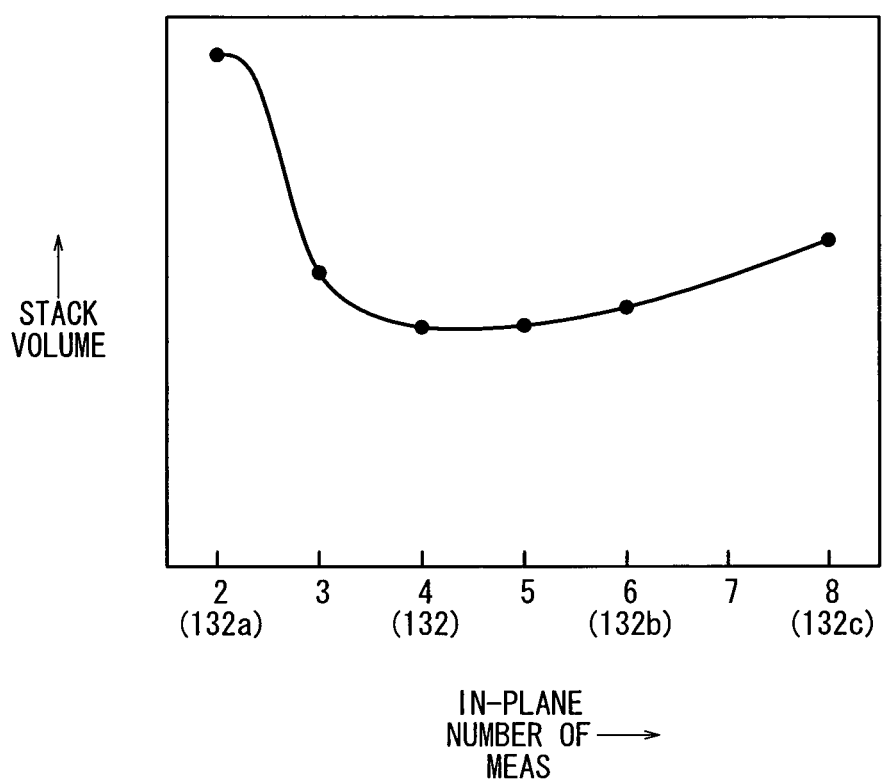
FIG. 12 is a graph showing volumes of respective stacks.

Next, the stacks 132, 132a to 132c are formed by stacking the required number of fuel cells, respectively, to achieve the same power generation output. For each of the stacks 132, 132a to 132c, the stack volume ($\pi D^2 \times L/4$) is shown in FIG. 12. As can be seen from FIG. 12, in the case of the stack 132 where the four electrolyte electrode assemblies 26 are arranged, in comparison with the other stacks 132a to 132c, the stack volume is small. Therefore, in the fuel cell stack 12 of the present application, the stack volume is minimized, and size reduction is achieved easily.

Figure 13:
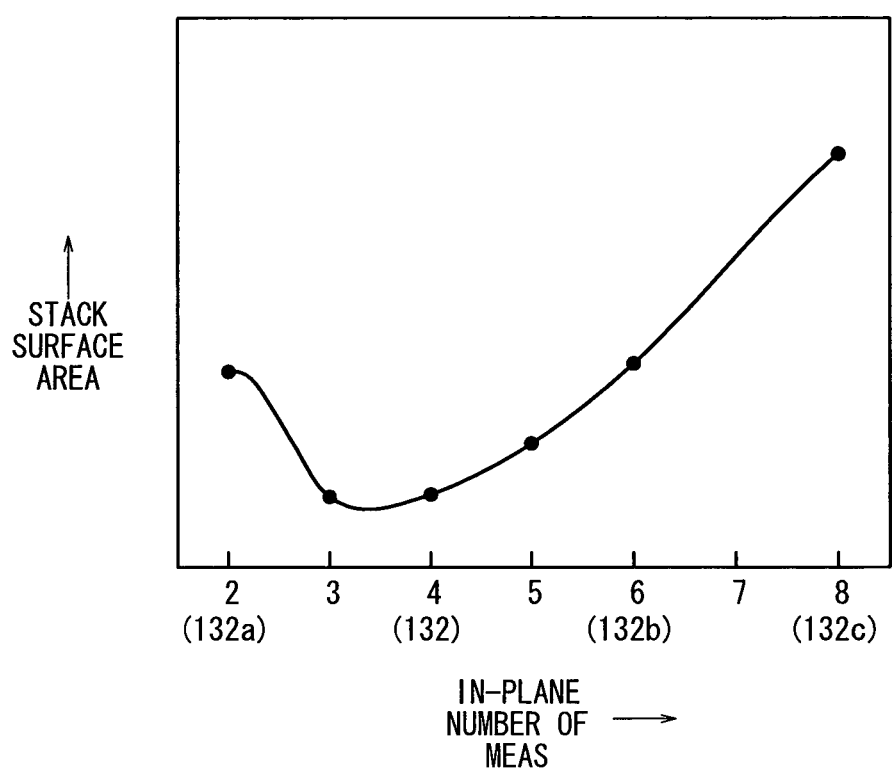
FIG. 13 is a graph showing surface areas of the respective stacks.

Further, for each of the stacks 132, 132a to 132c, the stack surface area ($\pi D^2/2 + \pi D \times L$) is shown in FIG. 13. As can be seen from FIG. 13, the surface area of the stack 132 is smaller than the surface areas of the stacks 132a to 132c. Thus, in the fuel cell stack 12 of the present application, heat radiation from the fuel cell stack 12 is minimized, and it is possible to improve heat efficiency, and facilitate thermally self-sustained operation.

As described above, in the first embodiment, the four electrolyte electrode assemblies 26 are arranged in a circle in the same separator plane. In comparison with the structure in which three or less, or five or more electrolyte electrode assemblies are arranged in the same plane, the optimum space efficiency is achieved.

Further, in the first embodiment, as shown in FIG. 3, the circular arc wall 44 is provided on the surface 36a of the sandwiching section 36 of the separator 28 in the path connecting the fuel gas inlet 38 and the fuel gas discharge channel 42, and the circular arc wall 44 contacts the anode 24 of the electrolyte electrode assembly 26.

In the structure, the fuel gas supplied from the fuel gas inlet 38 to the fuel gas channel 40 is blocked by the circular arc wall 44. Thus, the fuel gas does not flow straight from the fuel gas inlet 38 to the fuel gas discharge channel 42. The fuel gas flows around in the fuel gas channel 40, and the fuel gas flows along the anode 24 over the long distance. That is, the fuel gas flows along the anode 24 over a long period of time, and the fuel gas can be consumed effectively in the power generation reaction. Accordingly, the fuel gas utilization ratio is improved effectively.

The protrusion 46 which contacts the outer edge of the anode 24 is provided on the surface 36*a* of the sandwiching section 36. Therefore, it is possible to prevent oxidation due to the entry of the exhaust gas or the oxygen-containing gas into the anode 24 from the outside of the electrolyte electrode assembly 26. Accordingly, it is possible to prevent the power generation efficiency from being lowered due to oxidation, and improve durability of the separators 28 and the electrolyte electrode assemblies 26.

Further, the projections 48 provided on the sandwiching section 36 protrude on the side of the fuel gas channel 40, and contact the anode 24. By the projections 48, the desired current collection efficiency is achieved.

The consumed fuel gas supplied to the fuel gas channel 40 is discharged from the fuel gas discharge channel 42 to the oxygen-containing gas supply passage 68. Thus, in the oxygen-containing gas supply passage 68, the fuel gas in the exhaust gas after consumption in the power generation reacts with some of the oxygen-containing gas before consumption. As a result, the rest of the oxygen-containing gas before consumption is heated beforehand. Thus, it is possible to supply the oxygen-containing gas heated beforehand to the oxygen-containing gas channel 54, and improvement in the heat efficiency is achieved.

Further, since the sandwiching section 36 has a circular disk shape in correspondence with the electrolyte electrode assembly 26, it becomes possible to efficiently collect electrical energy generated in the electrolyte electrode assembly 26.

Further, since the sandwiching sections 36 are separated from each other, it becomes possible to absorb variation of the load applied to the respective electrolyte electrode assemblies 26 due to dimensional error in the electrolyte electrode assemblies 26 and the separators 28. Thus, the undesired distortion does not occur in the entire separators 28. It is possible to apply the load equally to each of the electrolyte electrode assemblies 26. Further, thermal distortion or the like of the electrolyte electrode assembly 26 is not transmitted to the adjacent, other electrolyte electrode assemblies 26, and no dedicated dimensional error absorbing mechanisms are required between the electrolyte electrode assemblies 26. Thus, the electrolyte electrode assemblies 26 can be provided close to each other, and the overall size of the fuel cell 10 can be reduced easily.

Further, the first bridges 34 extend radially outwardly from the fuel gas supply section 32 such that the first bridges 34 are spaced at equal intervals (angles). In the structure, the fuel gas can be supplied from the fuel gas supply section 32 equally to the respective electrolyte electrode assemblies 26 through the first bridges 34. Thus, improvement and stability in the power generation performance can be achieved in each of the electrolyte electrode assemblies 26.

Further, in the fuel cell stack 12, the tightening load applied to the fuel gas supply sections 32, 62 by the first tightening load applying unit 94 may be larger than the tightening load applied to the electrolyte electrode assemblies 26 by the second tightening load applying units 98.

In the structure, a relatively large tightening load is applied to the fuel gas supply sections 32, 62 to maintain the desired sealing performance, and a relatively small tightening load is applied to the electrolyte electrode assemblies 26 to prevent damage or the like of the electrolyte electrode assemblies 26. Accordingly, improvement in the current collection performance is achieved advantageously.

Figure 14:
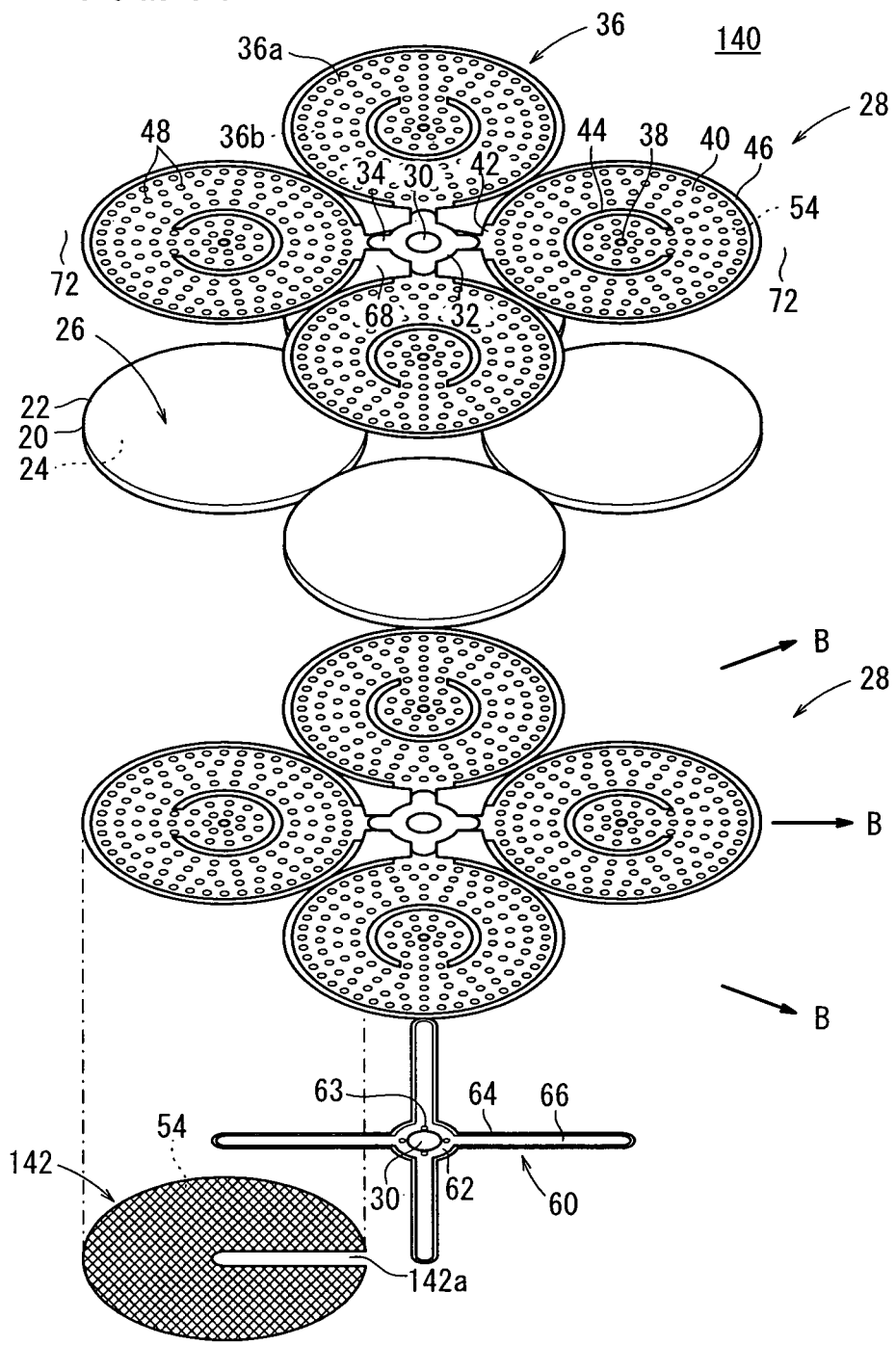
FIG. 14 is an exploded perspective view showing a fuel cell according to a second embodiment.

FIG. 14 is an exploded perspective view showing a fuel cell 140 according to a second embodiment of the present invention. The constituent elements that are identical to those of the fuel cell 10 according to the first embodiment are labeled with the same reference numeral, and description thereof will be omitted. Further, in third and fourth embodiments as described later, the constituent elements that are identical to those of the fuel cell 10 according to the first embodiment are labeled with the same reference numeral, and detailed description thereof will be omitted.

Figure 15:
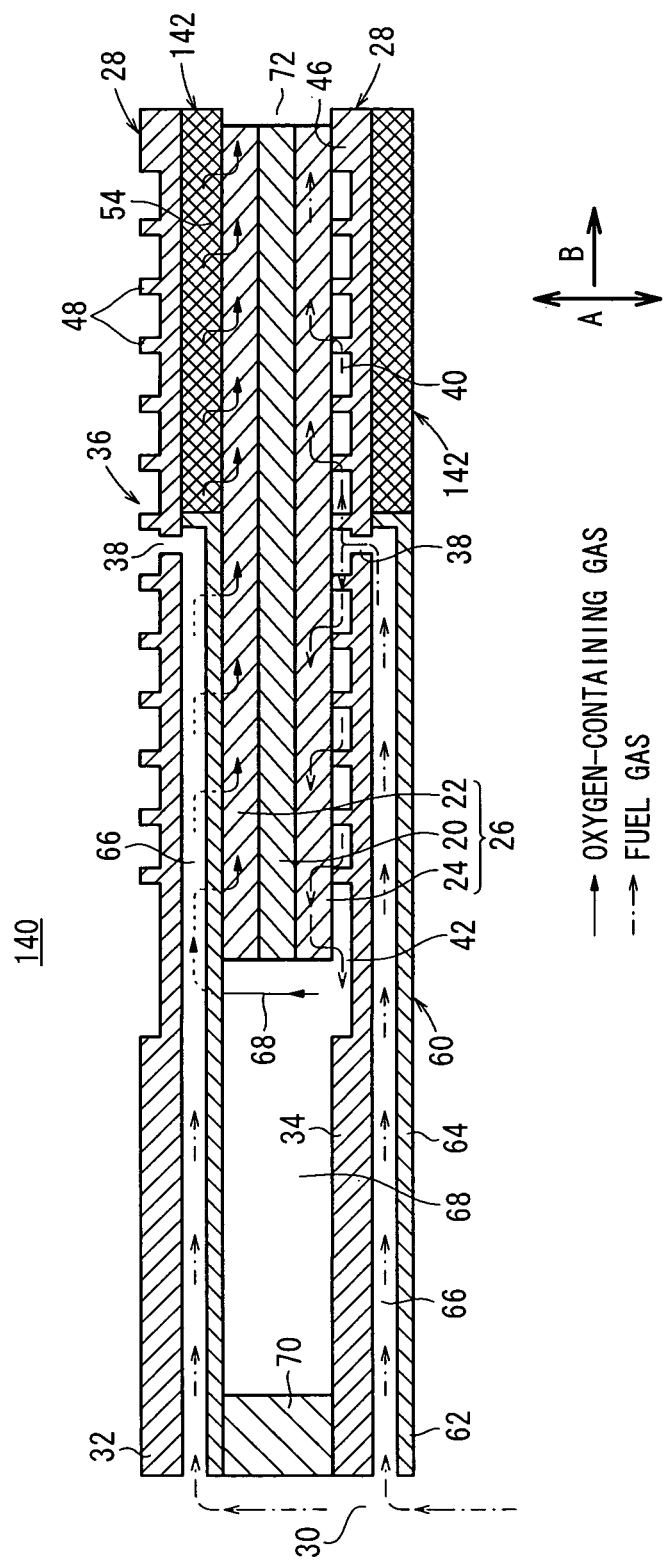
FIG. 15 is a cross sectional view schematically showing operation of the fuel cell.

The fuel cell 140 includes separators 28, and a mesh member (electrically conductive fabric such as metal mesh) instead of the plate 50 is provided on the surface 36*b* of each of the sandwiching sections 36 of the separators 28 (see FIGS. 14 and 15). An oxygen-containing gas channel 54 is formed in the mesh member 142. A cutout 142*a* is formed in the mesh member 142 as a space for providing the second bridge 64 of the channel member 60.

In the second embodiment, the same advantages as in the case of the first embodiment are obtained. Though the mesh member 142 is used in the second embodiment, instead of the mesh member 142, for example, an electrically conductive felt member (electrically conductive nonwoven fabric such as metal felt), foam metal, expanded metal, punching metal, or pressed/embossed metal may be used.

Figure 16:
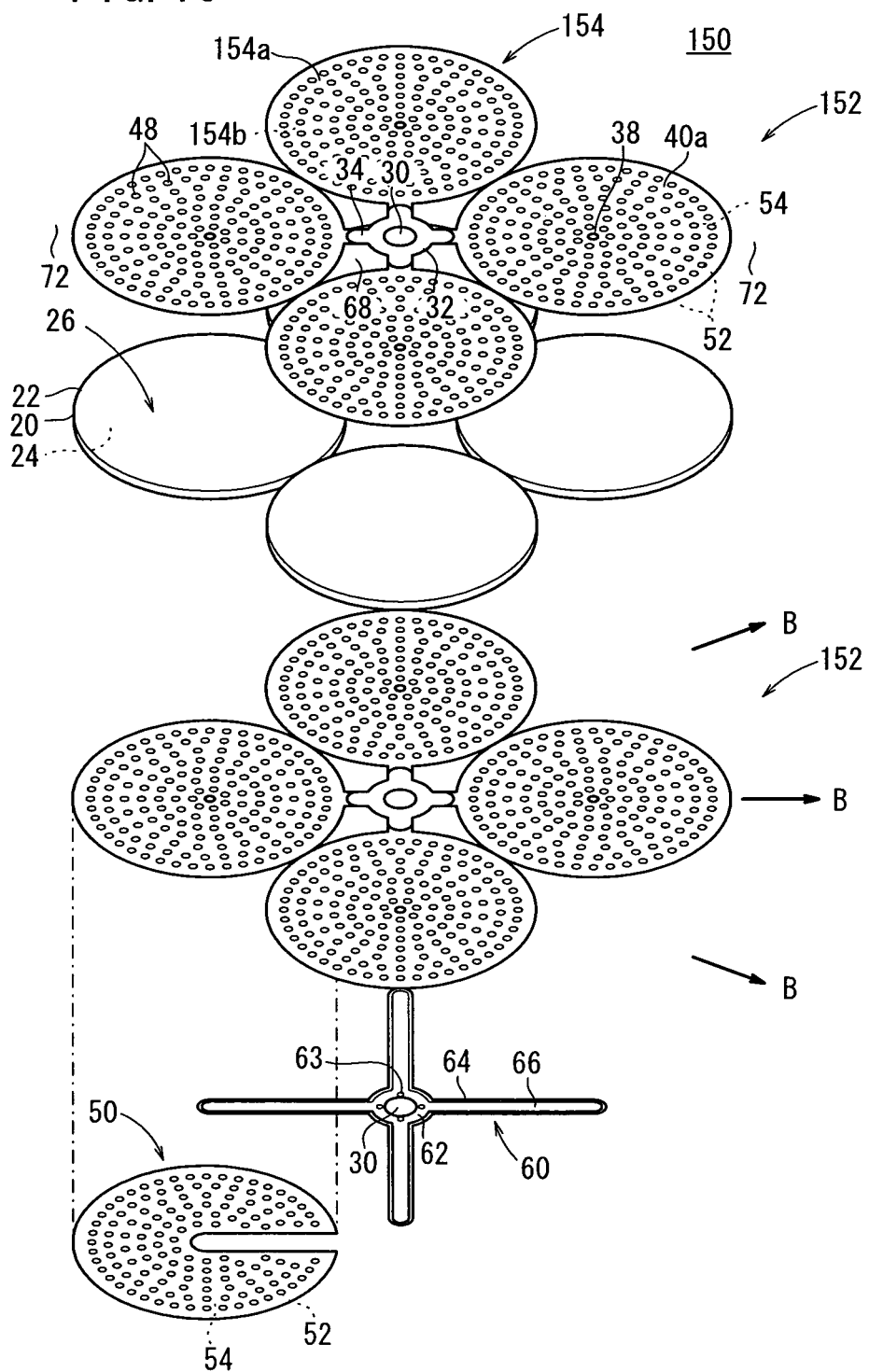
FIG. 16 is an exploded perspective view showing a fuel cell according to a third embodiment of the present invention.
Figure 17:
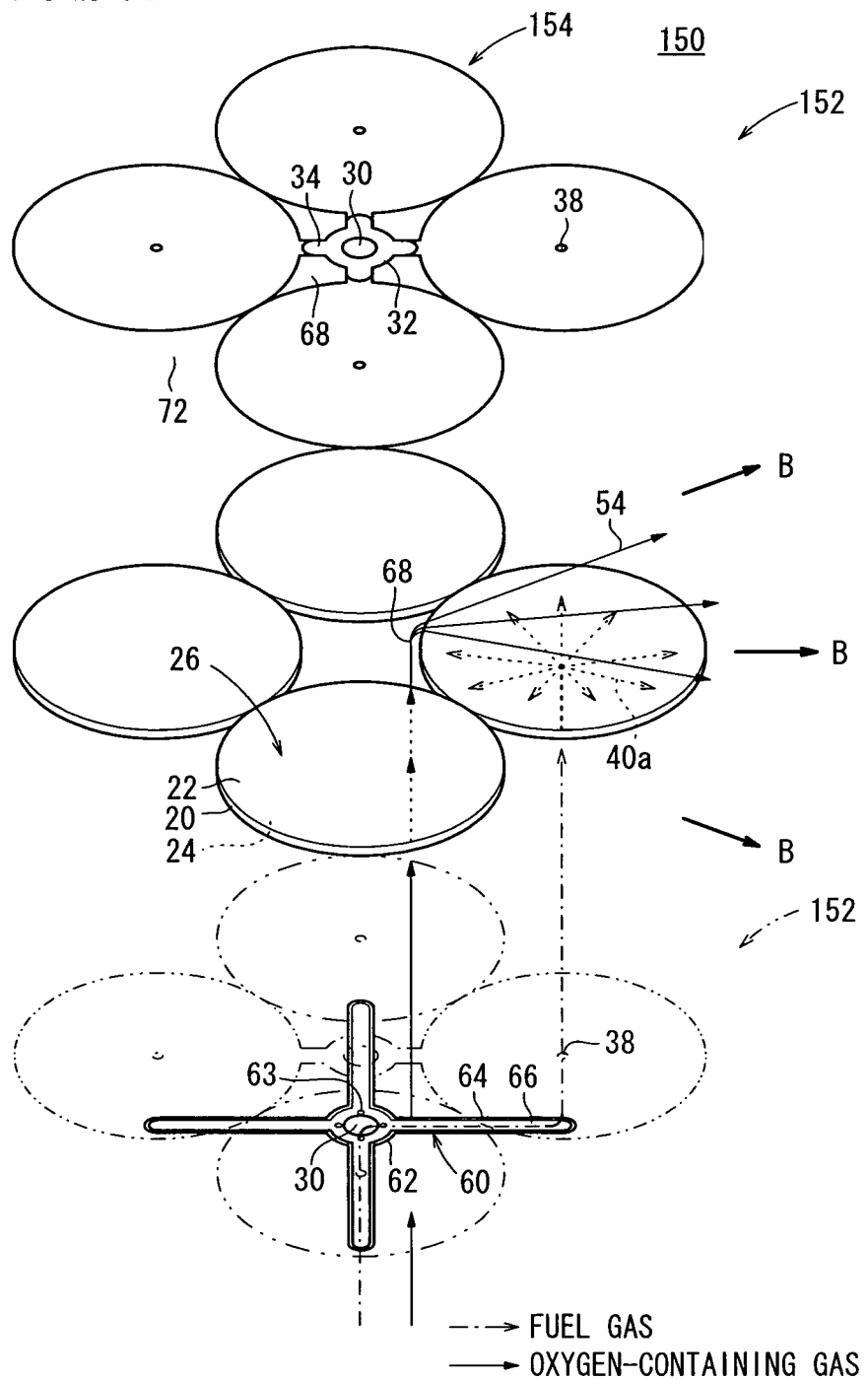
FIG. 17 is a partial exploded perspective view showing gas flows in the fuel cell.
Figure 18:
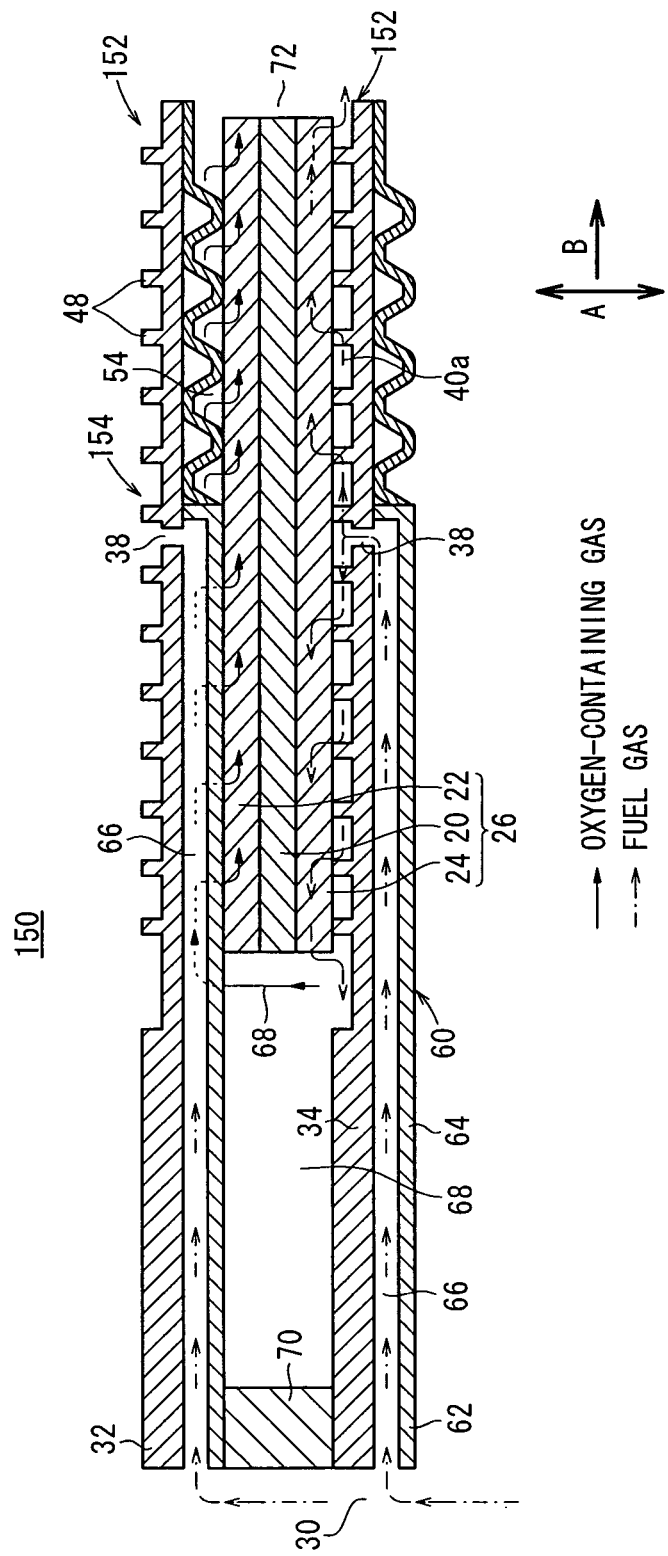
FIG. 18 is a cross sectional view schematically showing operation of the fuel cell.

FIG. 16 is an exploded perspective view showing a fuel cell 150 according to a third embodiment of the present invention. FIG. 17 is a partial exploded perspective view showing gas flows in the fuel cell 150.

The fuel cell 150 includes separators 152, and each of the separators 152 integrally includes a fuel gas supply section 32, four first bridges 34, and sandwiching sections 154 formed for the respective first bridges 34.

A fuel gas channel 40*a* for supplying the fuel gas along the electrode surface of the anode 24 is formed on a surface 154*a* of each sandwiching section 154 facing the anode 24. The circular arc wall 44 and the protrusion 46 according to the first embodiment are not formed on the surface 154*a*.

An oxygen-containing gas channel 54 is formed on a surface 154*b* opposite to the surface 154*a* of each sandwiching section 154, using the plate 50. Instead of the plate 50, a mesh member 142, an electrically conductive felt member (not shown), or the like may be used.

In the third embodiment, the fuel gas supplied to the fuel gas supply passage 30 flows through the fuel gas supply channel 66 of the fuel cell 150 along the surface of the separator 152.

The fuel gas from the fuel gas supply channel 66 flows through the fuel gas inlet 38 formed in the sandwiching section 154, and flows into the fuel gas channel 40*a*. In the structure, the fuel gas is supplied to substantially the central region of the anode 24. The fuel gas flows along the fuel gas channel 40 from the substantially central region to the outer circumferential region of the anode 24 (see FIG. 17).

The air supplied to the oxygen-containing gas supply passage 68 flows toward the oxygen-containing gas channel 54. In the oxygen-containing gas channel 54, the air flows from the inner circumferential edge to the outer circumferential edge of the cathode 22 (see FIG. 17).

Thus, in each of the electrolyte electrode assemblies 26, the fuel gas flows from the center to the outer circumferential side on the electrode surface of the anode 24, and the oxygen-containing gas flows in one direction indicated by the arrow B on the electrode surface of the cathode 22. By electrochemical reactions of the air and the fuel gas, electricity is generated.

In the third embodiment, the same advantages as in the cases of the first and second embodiments are obtained.

Figure 19:
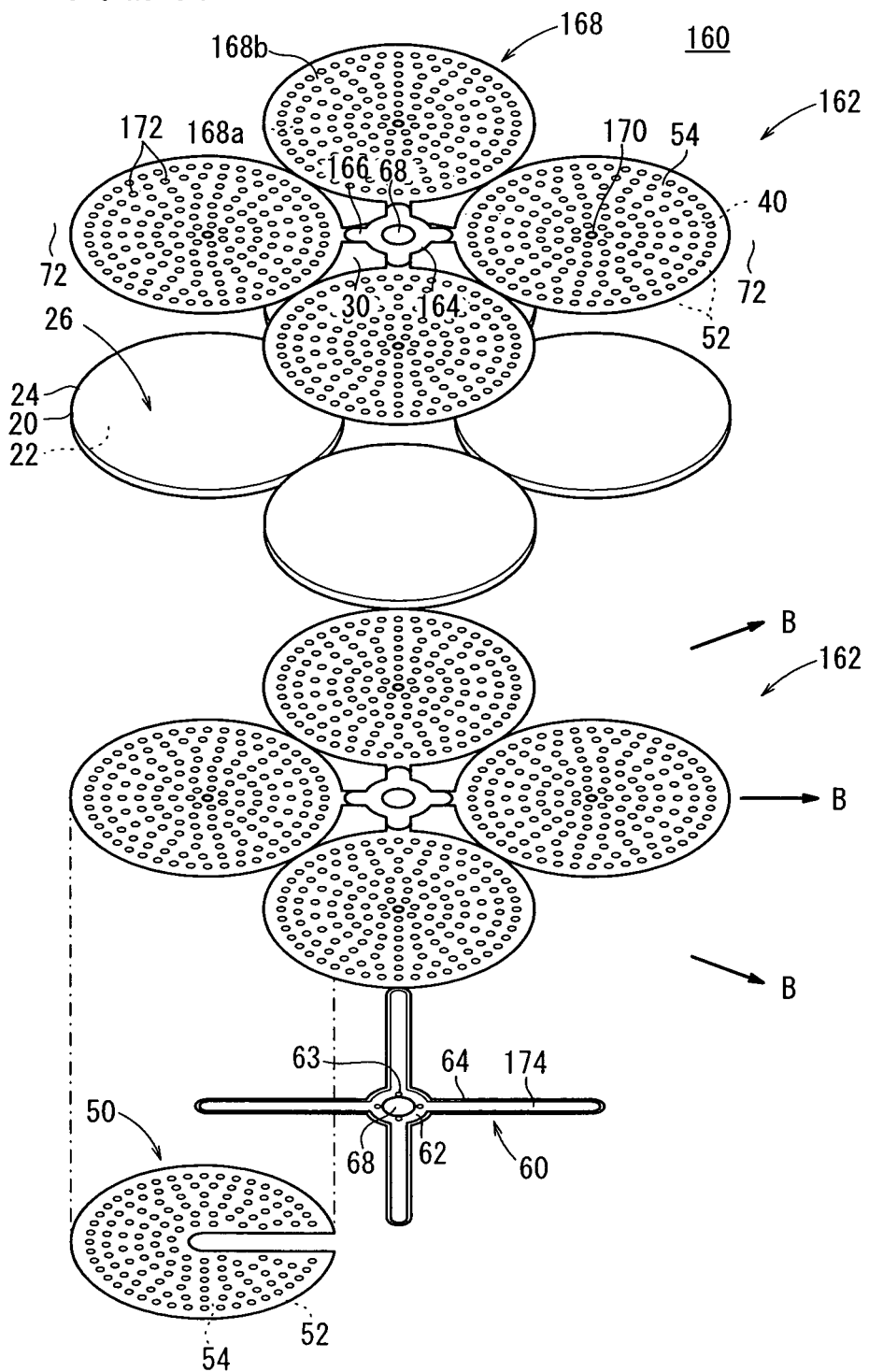
FIG. 19 is an exploded perspective view showing a fuel cell according to a fourth embodiment of the present invention.
Figure 20:
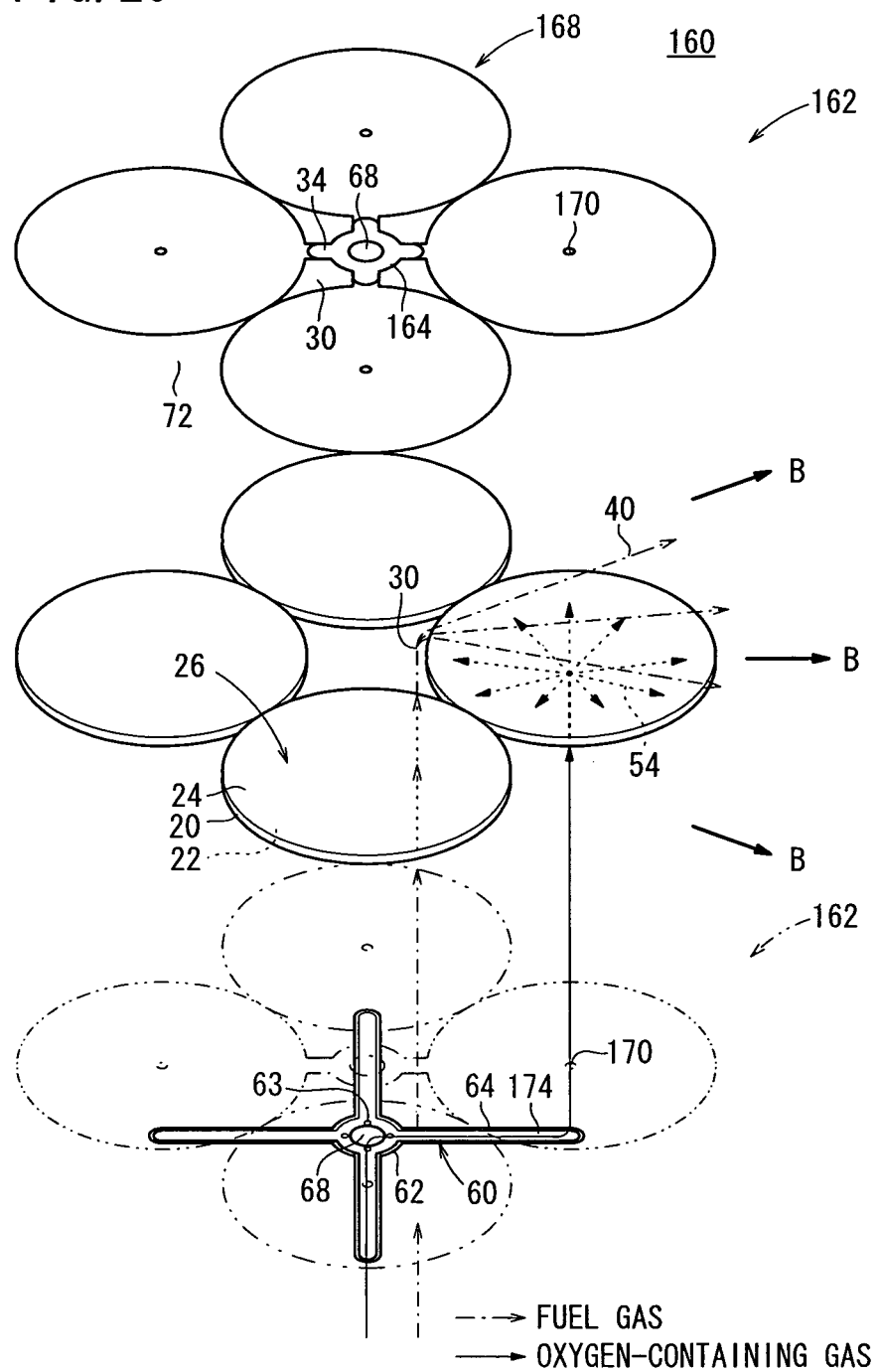
FIG. 20 is a partial exploded perspective view showing gas flows in the fuel cell.

FIG. 19 is an exploded perspective view showing a fuel cell 160 according to a fourth embodiment of the present invention. FIG. 20 is a partial exploded perspective view showing gas flows in the fuel cell 160.

The fuel cell 160 includes separators 162, and an oxygen-containing gas supply section (reactant gas supply section) 164 is formed at the center of each of the separators 162. An oxygen-containing gas supply passage 68 extends through the oxygen-containing gas supply section 164. Four first bridges 166 extend radially outwardly from the oxygen-containing gas supply section 164 at predetermined intervals (angles), e.g., at intervals of 90°. The oxygen-containing gas supply section 164 is integral with the sandwiching sections 168 through the first bridges 166.

An oxygen-containing gas inlet 170 for supplying the oxygen-containing gas is provided, e.g., at the center of the sandwiching section 168, or at a position deviated toward the upstream side from the center of the sandwiching section 168 in the flow direction of the fuel gas.

Each of the sandwiching sections 168 has an oxygen-containing gas channel 54 formed by projections 172 on a surface 168b which faces the cathode 22. Each of the sandwiching sections 168 has a fuel gas channel 40 formed on the surface 168a which faces the cathode 22. An oxygen-containing gas supply channel 174 connected between the oxygen-containing gas supply passage 68 to an oxygen-containing gas inlet 170 is formed between the first bridge 166 and a second bridge 64 of a channel member 60.

In the fourth embodiment, after the oxygen-containing gas is supplied to the oxygen-containing gas supply passage 68 provided at the center of the fuel cell 160, the oxygen-containing gas flows through the oxygen-containing gas supply channel 174 along the surface of the separator 162. Then, the oxygen-containing gas is supplied to the central region of the cathode 22 from the oxygen-containing gas inlet 170 formed at the center, or at a position near the center of the sandwiching section 168, and the oxygen-containing gas flows outwardly from the central region to the outer circumferential region of the cathode 22.

Figure 21:
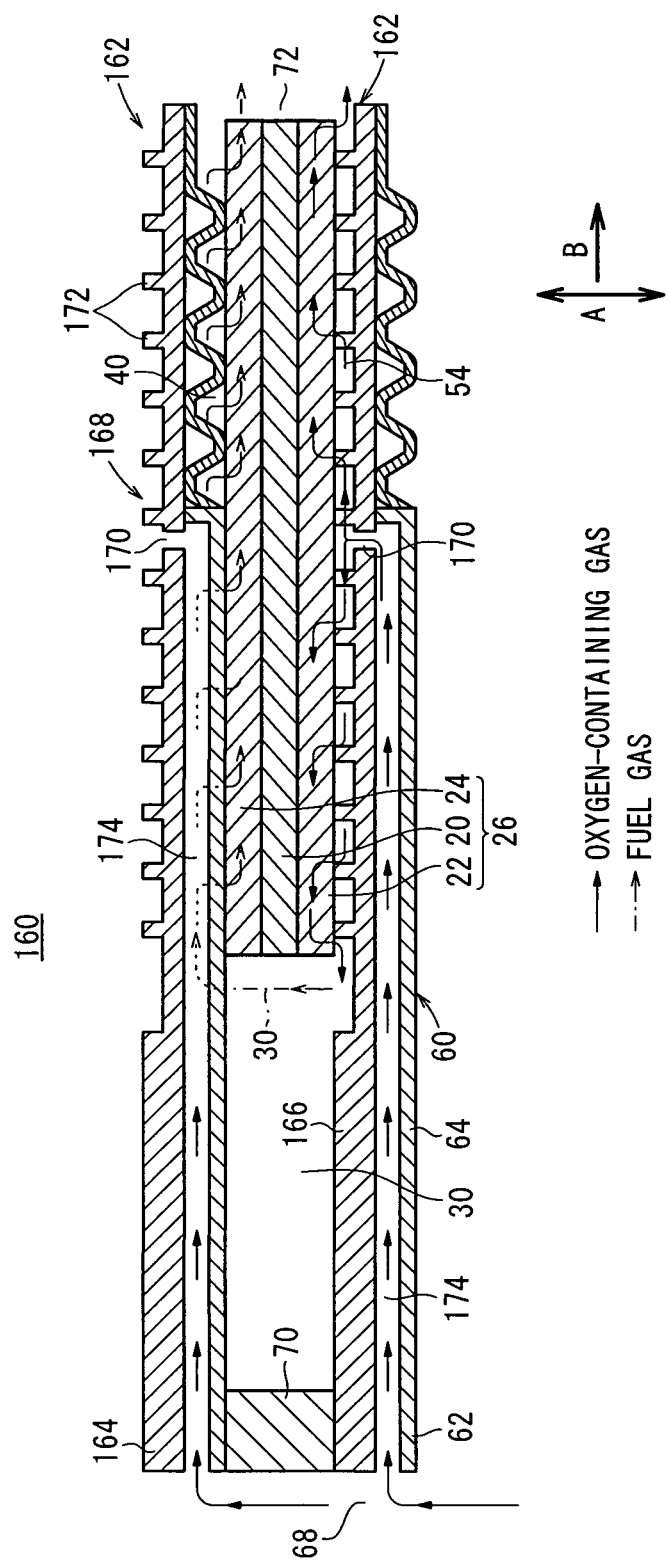
FIG. 21 is a cross sectional view schematically showing operation of the fuel cell.
Figure 22:
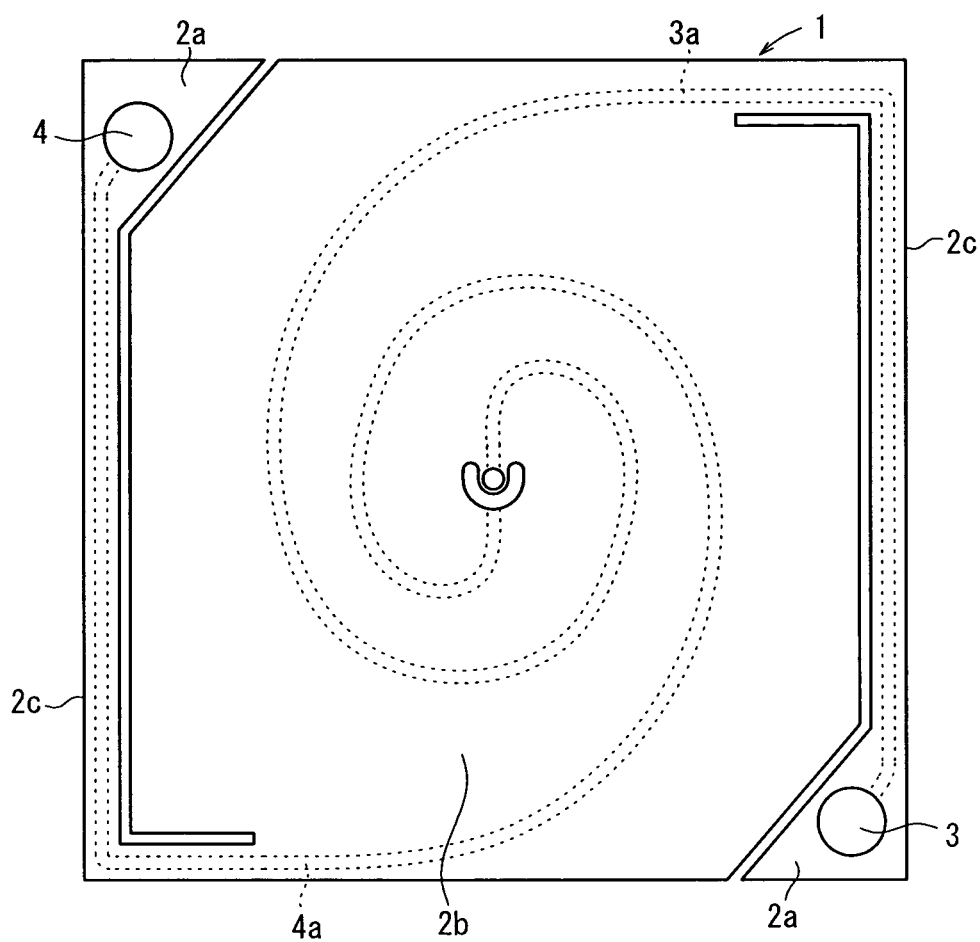
FIG. 22 is a view showing a separator of a conventional fuel cell.

As shown in FIG. 21, the fuel gas supplied to the fuel gas supply passage 30 flows into the space between the inner circumferential edge of the electrolyte electrode assembly 26 and the inner circumferential edge of the sandwiching section 168 in the direction indicated by the arrow B, and flows toward the fuel gas channel 40. In the fuel gas channel 40, the fuel gas flows from the inner circumferential edge to the outer circumferential edge of, i.e., from one end to the other end of the anode 24 of the electrolyte electrode assembly 26 in the direction indicated by the arrow B. The air is supplied from the center to the outer circumferential side on the electrode surface of the cathode 22 (see FIG. 20).

In the fourth embodiment, the same advantages as in the cases of the first to third embodiments are obtained.

Although the invention has been particularly shown and described with reference to preferred embodiments, it will be understood that variations and modifications can be effected thereto by those skilled in the art without departing from the spirit and scope of the invention as defined by the appended claims.

The invention claimed is:

1. A fuel cell, comprising a plurality of electrolyte electrode assemblies stacked between separators, the electrolyte electrode assemblies each including an anode, a cathode, and an electrolyte interposed between the anode and the cathode, the separators each comprising:
   sandwiching sections sandwiching the electrolyte electrode assemblies, the sandwiching sections each having a fuel gas channel for supplying a fuel gas along an electrode surface of the anode and an oxygen-containing gas channel for supplying an oxygen-containing gas along an electrode surface of the cathode separately;
   bridges connected to the sandwiching sections, the bridges each having a reactant gas supply channel for supplying the fuel gas to the fuel gas channel or supplying the oxygen-containing gas to the oxygen-containing gas channel; and
   a reactant gas supply section connected to the bridges, a reactant gas supply passage extending through the reactant gas supply section in a stacking direction for supplying the fuel gas or the oxygen-containing gas to the reactant gas supply channel,
   wherein the reactant gas supply section is provided at the center of the separator, and the electrolyte electrode assemblies are arranged in a circle around the reactant gas supply section, and
   wherein the sandwiching section includes:
   a fuel gas inlet for supplying the fuel gas to the fuel gas channel;
   a fuel gas discharge channel for discharging the fuel gas after consumption in the fuel gas channel; and
   a continuous arc shaped wall portion disposed between the fuel gas inlet and the fuel gas discharge channel and configured for preventing the fuel gas supplied from the fuel gas inlet from flowing straight from the fuel gas inlet to the fuel gas discharge channel along the fuel gas channel.

2. A fuel cell according to claim 1, wherein each of the sandwiching sections and the electrolyte electrode assemblies has a circular disk shape, and the sandwiching sections are separated from each other.

3. A fuel cell according to claim 1, wherein the bridges extend radially outwardly from the reactant gas supply section, and are spaced from each other at equal angular intervals.

4. A fuel cell according to claim 1, wherein the number of the sandwiching sections is four, and the number of the bridges is four, in correspondence with the number of the electrolyte electrode assemblies.

5. A fuel cell according to claim 1, wherein the sandwiching section includes a circumferential protrusion protruding on a side of the fuel gas channel, and contacting an outer edge of the anode.

6. A fuel cell according to claim 1, wherein the sandwiching section includes projections protruding on a side of the fuel gas channel to contact the anode.

7. A fuel cell according to claim 1, wherein the fuel cell is a solid oxide fuel cell.

8. A fuel cell stack, comprising a plurality of fuel cells stacked in a stacking direction, the fuel cells each formed by stacking electrolyte electrode assemblies between separators, the electrolyte electrode assemblies each including an anode, a cathode, and an electrolyte interposed between the anode and the cathode, the separators each comprising:
   sandwiching sections sandwiching the electrolyte electrode assemblies, the sandwiching sections each having a fuel gas channel for supplying a fuel gas along an electrode surface of the anode and an oxygen-containing gas channel for supplying an oxygen-containing gas along an electrode surface of the cathode separately;

bridges connected to the sandwiching sections, the bridges each having a reactant gas supply channel for supplying the fuel gas to the fuel gas channel or supplying the oxygen-containing gas to the oxygen-containing gas channel; and a reactant gas supply section connected to the bridges, a reactant gas supply passage extending through the reactant gas supply section in the stacking direction for supplying the fuel gas or the oxygen-containing gas to the reactant gas supply channel, wherein the reactant gas supply section is provided at the center of the separator, and the electrolyte electrode assemblies are arranged in a circle around the reactant gas supply section, and wherein the sandwiching section includes:

a fuel gas inlet for supplying the fuel gas to the fuel gas channel;

a fuel gas discharge channel for discharging the fuel gas after consumption in the fuel gas channel; and a continuous arc shaped wall portion disposed between the fuel gas inlet and the fuel gas discharge channel and configured for preventing the fuel gas supplied from the fuel gas inlet from flowing straight from the fuel gas inlet to the fuel gas discharge channel along the fuel gas channel.

9. A fuel cell stack according to claim 8, further comprising a load applying mechanism for applying a load to the fuel cells in the stacking direction, wherein the load applying mechanism is configured such that a load applied to a position near the reactant gas supply section becomes larger than a load applied to the electrolyte electrode assemblies.

10. A fuel cell stack according to claim 8, wherein the fuel cell is a solid oxide fuel cell.

11. A fuel cell according to claim 1, wherein the sandwiching section includes a continuous circumferential protrusion disposed along an outer edge thereof.

* * * * *